United States Patent Office 3,449,376
Patented June 10, 1969

3,449,376
3β,5β-EPOXY-A-NORANDROSTANE-2-ONES
Seymour D. Levine, North Brunswick, N.J., assignor, by mesne assignments, to E. R. Squibb & Sons, Inc., New York, N.Y., a corporation of Delaware
No Drawing. Original application Mar. 8, 1965, Ser. No. 438,042, now Patent No. 3,361,824, dated Jan. 2, 1968. Divided and this application June 15, 1967, Ser. No. 646,200
Int. Cl. C07c *171/06, 173/00;* A61k *27/00*
U.S. Cl. 260—348     7 Claims

ABSTRACT OF THE DISCLOSURE

This invention relates to new 17 - oxygenated - 3β,5β-epoxy - A - norandrostane - 2 - ones, which are useful as intermediates in the preparation of the corresponding 3 - halo - 17 - oxygenated - A - nor - Δ³ - androstene-2 - ones, to which they are converted by treatment with a hydrogen halide. The 3β,5β - epoxides are formed by treating the corresponding 17 - oxygenated - A - nor-Δ³ - androstene - 2 - ones with hydrogen peroxide.

---

This application is a division of my application, Ser. No. 438,042, filed Mar. 8, 1965, Now Patent No. 3,361,-824, granted Jan. 2, 1968.

This invention relates to new chemical compounds and more particularly to new steroidal substances and their method of preparation.

The new steroids of this invention can be depicted by the Formula I:

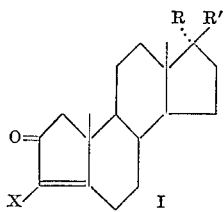

wherein X is halogen, preferably chloro and bromo; R is hydrogen or methyl, R' is hydroxy or acyloxy, or together R and R' is keto.

The new steroids of Formula I are physiologically active substances that possess anti-androgenic activity. Hence, they can be administered as a topical ointment in lieu of known anti-androgenic agents, such as A-norprogesterone, in the treatment of hyperandrogenic acne.

The final products of this invention are prepared by interacting a steroid of the Formula II:

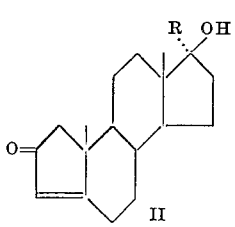

wherein R is as hereinbefore defined, with hydrogen peroxide to yield, interalia, new intermediates of this invention of the Formula III:

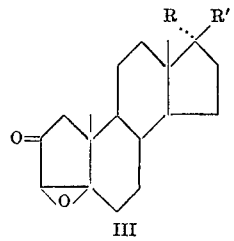

wherein R and R' aare as hereinbefore defined.

These new intermediates are then interacted with a hydrogen halide, preferably hydrogen chloride and hydrogen bromide, to yield the final products of this invention of the Formula I.

The suitable starting steroidal materials are A - nortestosterone and 17α - methyl - A - nortestosterone. These compounds on treatment with hydrogen peroxide yield, inter alia, 3β,5β - epoxy - A - norandrostane-2-one - 17β - ol and 3β,5β - epoxy - 17α - methyl - A - norandrostane - 2 - one - 17β - ol, respectively. To prepare the other new intermediates of Formula III of this invention, either 3β,5β - epoxy - A - norandrostane - 2 - one-17β - ol is oxidized by treatment with chromium trioxide to yield 3β,5β - epoxy - A - norandrostane - 2,17 - dione; or 3β,5β - epoxy - A - norandrostane - 2 - one - 17β - ol or 3β,5β - epoxy - 17α - methyl - A - norandrostane-2-one - 17β - ol is treated with an acid anhydride or acyl halide of the desired acid to yield the 17β - ester derivative. Among the suitable acid anhydrides and acyl halides, those preferred are the anhydrides or acyl chlorides of hydrocarbon carboxylic acids of less than twelve carbon atoms, as exemplified by the lower alkanoic acids (e.g., acetic, propionic, butyric and hexanoic acid), the lower alkenoic acids, the monocyclic aryl carboxylic acids (e.g., benzoic acid), the monocyclic aryl lower alkanoic acids (e.g., phenacetic and β - phenylproprionic acid), the monocyclic cycloalkanecarboxylic acids, the monocyclic cycloalkenecarboxylic acids, the monocyclic cycloalkane lower alkanoic acids, and the monocyclic cycloalkane lower alkenoic acids.

The resulting compounds of Formula II are then reacted with a hydrogen halide to yield the final products of this invention. If a free 17β - hydroxy starting material is used when R is hydrogen and the reaction is carried out in the presence of glacial acetic acid as the solvent, the compound obtained is in the form of its 17-acetate. If, however, the reaction is conducted in an inert solvent, such as chloroform and/or ethanol, then the final product is obtained in its free 17β-hydroxy form.

The following examples illustrate the invention (all temperatures being in centigrade):

EXAMPLE 1

3β,5β-epoxy-A-norandrostane-2-one-17β-ol

A solution of 2 g. of A-nortestosterone in 20 ml. of methanol is treated with 8 ml. of 30% hydrogen peroxide solution and 4 ml. of aqueous 4 N sodium hydroxide solution and left at room temperature for 16 hours. The reaction mixture is diluted with water and extracted five times with ether. The ether extracts are wased with 8% salt solution, dried over sodium sulfate and evaporated to dryness. Plate chromatography of the residue using silica gel as the adsorbent and chloroform containing 2% methanol as the developing solvent gives two bands detectable with iodine which are eluted with ethyl acetate. Crystallization of the residue from the less polar band from isopropyl ether gives 3β,5β-epoxy-A-norandrostane- 2-one-17β-ol having a melting point of about 143.5–144.5°. The analytical sample is prepared by recrystallization from isopropyl ether, M.P. about 144–145°; $[\alpha]_D^{26}$ +102° (chf.);

$\lambda_{max}^{KBr}$ 2.83 and 5.77μ

τ Si(CH$_3$)$_4$ 9.22 (s., 18=Me), 8.82 (s., 19=Me), 7.88 (s., 1=CH$_2$), 6.87 (m., 3=H) and 6.39 (m., 17=H).

*Analysis.*—Calcd. for C$_{18}$H$_{26}$O$_3$ (290.39): C, 74.44; H, 9.03. Found: C, 74.35; H, 8.85.

EXAMPLE 2

17α-methyl-3β,5β-epoxy-A-norandrostane-2-one-17β-ol

Following the procedure of Example 1 but substituting 17α-methyl-A-nortestosterone for the A-nortestosterone, there is obtained 17α-methyl-3β,5β-epoxy-A-norandrostane-2-one-17β-ol.

EXAMPLE 3

3β,5β-epoxy-A-norandrostane-2,17-dione

A solution of 250 mg. of 3β,5β-epoxy-A-norandrostane-2-one-17β-ol in 10 ml. of acetone is treated dropwise with stirring with a slight excess of chromium trioxide-sulfuric acid. Ethanol is added to decompose excess oxidizing agent and the acetone layer is decanted. The inorganic residue is washed with additional acetone. The acetone fractions are combined and evaporated to dryness to give 3β,5β-epoxy-A-norandrostane-2,17-dione.

EXAMPLE 4

3β,5β-epoxy-A-norandrostane-2-one-17β-ol acetate

A mixture of 100 mg. of 3β,5β-epoxy-A-norandrostane-2-one-17β-ol, 0.1 ml. of pyridine, and 1 ml. of acetic anhydride is left at room temperature for 16 hours. The reaction mixture is poured into ice-water and extracted with ether. The ether extracts are wased with a saturated sodium bicarbonate solution, 8% salt solution, dried over sodium sulfate and evaporated to dryness to yield 3β,5β-epoxy-A-norandrostane-2-one-17β-ol acetate.

In a similar manner, by substituting any other acid anhydride for the acetic anhydride in the procedure of Example 4, the corresponding ester is formed.

EXAMPLE 5

17α-methyl-3β,5β-epoxy-A-norandrostane-2-one-17β-ol acetate

A solution of 0.0033 ml. of perchloric acid in 0.3 ml. of acetic anhydride is added to 500 mg. of 17α-methyl-3β,5β-epoxy-A-norandrostane-2-one-17β-ol in 10 ml. of acetic anhydride. The reaction mixture is stirred at room temperature for 30 min. and then poured into ice-water and extracted with chloroform. The chloroform extracts are washed with a saturated sodium bicarbonate solution, 8% salt solution, dried over sodium sulfate and evaporated to dryness to give 17α-methyl-3β,5β-epoxy-A-norandostane-2-one-17β-ol acetate.

In a similar manner, by substituting any other acid anhydride for the acetic anhydride in the procedure of Example 5, the corresponding ester is formed.

EXAMPLE 6

3-chloro-Δ$^3$-A-norandrostene-2-one-17β-ol acetate

A solution of 150 mg. of 3β,5β-epoxy-A-norandrostane-2-one-17β-ol in 10 ml. of glacial acetic acid is sautrated with hydrogen chloride gas and refluxed for 10 hours. The reaction mixture is concentrated and the residue taken up in chloroform. The chloroform solution is washed with saturated sodium bicarbonate solution, 8% salt solution, dried over sodium sulfate and evaporated to dryness to give 3-chloro-Δ$^3$-A-norandrostene-2-one-17β-ol acetate. The analytical sample is prepared by recrystallization from acetone-hexane, M.P. about 175–177°; $[\alpha]_D^{27}$ +26° (chf.);

$\lambda_{max}^{KBr}$ 5.80 and 6.13μ

λ EtOH 246 mμ (13,400); τ Si(CH$_3$)$_4$ 9.14 (s., 18=Me), 8.78 (s., 19=Me), 7.95 (s., 17=acetate), and 5.39 (m., 17=H).

*Analysis.*—Calcd. for C$_{20}$H$_{27}$O$_3$Cl (350.87): C, 68.46; H, 7.76. Found: C, 68.35; H, 7.77.

EXAMPLE 7

3-chloro-Δ$^3$-A-norandrostene-2-one-17β-ol

A solution of 100 mg. of 3β,5β-epoxy-A-norandrostane-2-one-17β-ol in 9 ml. of chloroform and 1 ml. of ethanol is saturated with hydrogen chloride gas and refluxed for 8 hours. The reaction mixture is washed with saturated sodium bicarbonate solution, 8% salt solution, dried over sodium sulfate and evaporated to give 3-chloro-Δ$^3$-A-norandrostene-2-one-17β-ol.

Similarly, by substituting 17-esters for the free 17-hydroxy compound in Example 7, the corresponding esters of 3-chloro-Δ$^3$-A-norandrostene-2-one-17β-ol are formed.

EXAMPLE 8

17α-methyl-3-chloro-Δ$^3$-A-norandrostene-2-one-17β-ol

Following the procedure in Example 7 but substituting 17α - methyl - 3β,5β-epoxy-A-norandrostane-2-one-17β-ol for 3β,β-epoxy-A-norandrostane-2-one-17β-ol there is obtained 17α - methyl-3-chloro-Δ$^3$-A-norandrostene-2-one-17β-ol.

EXAMPLE 9

17α-methyl-3-chloro-Δ$^3$-A-norandrostene-2-one-17β-ol 17-acetate

Following the procedure of Example 7, but substituting 17α - methyl - 3β,5β-epoxy-A-norandrostane-2-one-17β-ol acetate for the steroid reactant, there is obtained 17α-methyl - 3 - chloro - Δ$^3$ - A-norandrostene-2-one-17β-ol 17-acetate.

EXAMPLE 10

3-chloro-Δ$^3$-A-norandrostene-2,17-dione

Following the procedure of Example 7, but substituting 3β,5β-epoxy-A-norandrostane-2,17-dione for the steroid reactant, there is obtained 3-chloro-Δ$^3$-A-norandrostene-2,17-dione.

EXAMPLE 11

3-bromo-Δ$^3$-A-norandrostene-2-one-17β-ol acetate

Following the procedure of Example 6 but substituting hydrogen bromide gas for the hydrogen chloride gas, there is obtained 3 - bromo - Δ$^3$ - A-norandrostene-2-one-17β-ol acetate.

Similarly, by substituting 17α-methyl-3β,5β-epoxy-A-norandorstane-2-one-17β-ol or 3β,5β-epoxy-A-norandrostane-2,17-dione for the 3β,5β-epoxy-A-norandrostane-2-one-17β-ol in the procedures of Examples 6 and 7 and hydrogen bromide gas for the hydrogen chloride gas in these examples, 17α-methyl-3-bromo-Δ$^3$-A-norandrostene-2-one-17β-ol or 3-bromo-Δ$^3$-A-norandrostene-2,17-dione is obtained, respectively.

What is claimed is:

1. A steroid of the formula

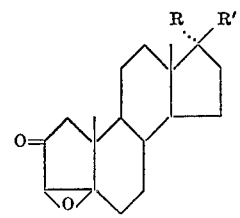

wherein R is selected from the group consisting of hydrogen and methyl, R' is selected from the group consisting of hydroxy and the acyloxy radical of a hydrocarbon carboxylic acid of less than twelve carbon atoms, and together R and R' is keto.

2. 3β,5β-epoxy-A-norandrostane-2-one-17β-ol.

3. An ester of 3β,5β-epoxy-A-norandrostane-2-one-17β-ol and a hydrocarbon carboxylic acid of less than twelve carbon atoms.

4. 3β,5β-epoxy-A-norandrostane-2-one-17β-ol acetate.

5. 17α - methyl - 3β,5β-epoxy-A-norandrostane-2-one-17β-ol.

6. An ester of 17α - methyl - 3β,5β-epoxy-A-norandrostane-2-one-17β-ol and a hydrocarbon carboxylic acid of less than twelve carbon atoms.

7. 3β-5β-epoxy-A-norandrostane-2,17-dione.

References Cited
UNITED STATES PATENTS 3,309,398   3/1967   Kerwin _____ 260—348 X NORMA S. MILESTONE, *Primary Examiner.*

U.S. Cl. X.R.

260—348.5, 468, 476, 483, 586, 999